United States Patent
Liu et al.

(10) Patent No.: US 11,146,937 B2
(45) Date of Patent: Oct. 12, 2021

(54) METHOD AND SYSTEM FOR GENERATING AND TRANSMITTING BLE ADVERTISING PACKET THROUGH CLASSIC BLUETOOTH

(71) Applicant: SHENZHEN BLUETRUM TECHNOLOGY CO., LTD., Guangdong (CN)

(72) Inventors: Jingfa Liu, Guangdong (CN); Jinhong Lin, Guangdong (CN)

(73) Assignee: SHENZHEN BLUETRUM TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/158,034

(22) Filed: Jan. 26, 2021

(65) Prior Publication Data

US 2021/0274332 A1    Sep. 2, 2021

(30) Foreign Application Priority Data

Feb. 28, 2020   (CN) .......................... 202010134623.3

(51) Int. Cl.
| | |
|---|---|
| H04W 76/10 | (2018.01) |
| H04W 4/80 | (2018.01) |
| H04W 8/00 | (2009.01) |
| H04L 29/08 | (2006.01) |
| H04W 84/18 | (2009.01) |

(52) U.S. Cl.
CPC ............. *H04W 4/80* (2018.02); *H04L 69/321* (2013.01); *H04W 8/005* (2013.01); *H04W 84/18* (2013.01)

(58) Field of Classification Search
CPC combination set(s) only.
See application file for complete search history.

(56) References Cited

U.S. PATENT DOCUMENTS

| | | | |
|---|---|---|---|
| 2014/0355517 A1* | 12/2014 | Reunamaki | H04W 8/005 370/328 |
| 2017/0201859 A1* | 7/2017 | Banerjea | G01S 3/48 |
| 2017/0223615 A1* | 8/2017 | Lee | H04W 36/03 |
| 2018/0007499 A1* | 1/2018 | Lee | H04W 4/00 |
| 2018/0152979 A1* | 5/2018 | Lee | H04W 72/0406 |
| 2018/0220335 A1* | 8/2018 | Lee | H04W 52/0229 |
| 2019/0082465 A1* | 3/2019 | Yoshimoto | H04W 74/06 |
| 2019/0104424 A1* | 4/2019 | Hariharan | H04R 3/12 |
| 2019/0253857 A1* | 8/2019 | Li | H04W 4/80 |
| 2019/0306905 A1* | 10/2019 | Lin | H04W 76/27 |
| 2019/0347922 A1* | 11/2019 | Burton | G08B 21/24 |
| 2020/0228901 A1* | 7/2020 | Baek | H04R 25/405 |
| 2020/0329400 A1* | 10/2020 | Goyal | H04W 4/80 |
| 2021/0076200 A1* | 3/2021 | Agopsowicz | H04W 12/03 |

* cited by examiner

*Primary Examiner* — Cindy Trandai
(74) *Attorney, Agent, or Firm* — Yue (Robert) Xu; Apex Attorneys at Law, LLP

(57) ABSTRACT

A method and a system for generating and transmitting a BLE advertising packet through Classic Bluetooth are provided. By modifying the modulation characteristics and packet generation characteristics of Classic Bluetooth, the BLE advertising packet is carried by a Classic Bluetooth packet, the minimum frequency deviation for Classic Bluetooth is modified, and transmission phases of the Access Code and the Header in the Classic Bluetooth packet are skipped when transmitting the Classic Bluetooth packet, such that the BLE advertising packet can be transmitted through Classic Bluetooth, thereby implementing a Bluetooth beacon function.

13 Claims, 3 Drawing Sheets

METHOD AND SYSTEM FOR GENERATING AND TRANSMITTING BLE ADVERTISING PACKET THROUGH CLASSIC BLUETOOTH

CROSS REFERENCE OF RELATED APPLICATION

This application claims the priority to Chinese Patent Application No. 202010134623.3, titled "METHOD AND SYSTEM FOR GENERATING AND TRANSMUTING BLE ADVERTISING PACKET THROUGH CLASSIC BLUETOOTH", filed on Feb. 28, 2020 with the China National Intellectual Property Administration, which is incorporated herein by reference in its entirety.

FIELD

The present disclosure relates to the field of Bluetooth communication, and particularly, to a method and a system for generating and transmitting a BLE advertising packet through Classic Bluetooth.

BACKGROUND

The Bluetooth Special Interest Group (SIG) released Bluetooth Low Energy (BLE) in the Bluetooth 4.0 protocol, which causes new vitality in the field of Bluetooth. In recent years, BLE is widely used and accepted by consumers. Apple Inc., in order to improve the user experience when using Bluetooth earphone, employs a scheme of applying BLE advertising in conjunction with mobile phone pop-ups, which is much more convenient as compared with Classic Bluetooth connection, and is therefore followed by other mobile phone brands.

However, in some conventional single-mode Classic Bluetooth solutions, or Bluetooth solutions that do not support the BLE function due to cost considerations, the BLE advertising can not be applied and thus such convenient connection is impossible.

The Bluetooth earphone connection from Apple Inc. operates on the basis of the Bluetooth beacon function of BLE advertising. When switched on, the earphone turns on the BLE advertising to make itself a Bluetooth beacon. When an Apple mobile phone approaches the earphone, the Apple mobile phone receives the BLE advertising and pops up a menu of related connections according to the content of the BLE advertising. This function simplifies the connecting process as compared with Classic Bluetooth and significantly improves user experience. A Bluetooth beacon may be transmitted over a long transmission distance at a high speed and with high security, and thus is applicable in various fields and has vast market prospects. The Bluetooth beacon is generally used in scenarios including: a) information pushing, for example, shopping malls, supermarkets, museums, airports and the like; b) indoor navigation, for example, exhibitions, libraries, hotels campus and the like; and c) Interaction with other functions, such as WeChat Shake, etc.

However, in the conventional technology, the Bluetooth beacon function cannot be realized through classic Bluetooth.

SUMMARY

In view of this, in an aspect, a method for generating and transmitting a BLE advertising packet through Classic Bluetooth is provided according to the present disclosure, with which the Bluetooth beacon function can be implemented by generating a BLE advertising packet through Classic Bluetooth.

Technical solutions of the present disclosure are described as follows.

A method for generating and transmitting a BLE advertising packet through Classic Bluetooth is provided. The method includes following steps of S1011 to S1013.

In step S1011, a BLE advertising packet is generated based on data to be broadcasted. The BLE advertising packet includes Preamble, Access Address, PDU and CRC, and the CRC is calculated based on content of the PDU.

In step S1012, an applicable Classic Bluetooth packet type is selected according to a length of the BLE advertising packet.

In step S1013, a Classic Bluetooth packet of the selected Classic Bluetooth packet type is generated. The Classic Bluetooth packet comprises Access Code, Header and Payload, the Access Code and the Header are generated by a Classic Bluetooth baseband unit, and the BLE advertising packet is carried by the Payload.

In an embodiment, the BLE advertising packet is content to be broadcasted by using Classic Bluetooth.

In an embodiment, step S1011 further includes: performing BLE whitening processing on the PDU and the CRC according to BLE advertising channels.

In an embodiment, the BLE advertising channels are channel 37, channel 38, and channel 39 defined in Bluetooth core specifications.

In an embodiment, the Classic Bluetooth packet is a basic rate packet.

In an embodiment, the Classic Bluetooth packet of the selected Classic Bluetooth packet type has no forward error correction (FEC).

In an embodiment, a length of the Payload of the Classic Bluetooth packet is greater than or equal to the length of the BLE advertising packet.

In an embodiment, the method further includes steps of S1021 to S1022.

In step S1021, a minimum frequency deviation is modified to conform to a minimum frequency deviation for BLE by adjusting parameters of a Classic Bluetooth Modem.

In step S1022, the Classic Bluetooth packet carrying the BLE advertising packet is transmitted by using a Classic Bluetooth radio frequency (RF) module, during which transmission phases of the Access Code and the Header in the Classic Bluetooth packet are skipped.

In an embodiment, a Classic Bluetooth whitening function is disabled when transmitting the Classic Bluetooth packet carrying the BLE advertising packet by using the Classic Bluetooth RF module.

In an embodiment, step S1022 of transmitting the Classic Bluetooth packet carrying the BLE advertising packet by using the Classic Bluetooth RF module includes: transmitting the BLE advertising packet through specific Classic Bluetooth channels.

In an embodiment, in step S1022, the transmission phases of the Access Code and the Header are skipped by controlling an on period of the Classic Bluetooth RF module.

With the method for generating and transmitting a BLE advertising packet through Classic Bluetooth, the BLE advertising packet is carried by a Classic Bluetooth packet, the minimum frequency deviation for Classic Bluetooth is modified, and transmission phases of the Access Code and the Header in the Classic Bluetooth packet are skipped when transmitting the Classic Bluetooth packet, such that the BLE advertising packet can be transmitted through Classic Bluetooth, thereby implementing a Bluetooth beacon function.

A system including a Classic Bluetooth transmitter is provided. The Classic Bluetooth transmitter is configured to generate a BLE advertising packet based on data to be broadcasted, wherein the BLE advertising packet comprises Preamble, Access Address, PDU and CRC, and the CRC is calculated based on content of the PDU; select, according to a length of the BLE advertising packet, an applicable Classic Bluetooth packet type; and generate a Classic Bluetooth packet of the selected Classic Bluetooth packet type, wherein the Classic Bluetooth packet comprises Access Code, Header and Payload, the Access Code and the Header are generated by a Classic Bluetooth baseband unit, and the BLE advertising packet is carried by the Payload.

In an embodiment, the Classic Bluetooth transmitter is further configured to modify a minimum frequency deviation to conform to a minimum frequency deviation for BLE by adjusting parameters of a Classic Bluetooth Modem; and transmit the Classic Bluetooth packet carrying the BLE advertising packet by using a Classic Bluetooth radio frequency (RF) module, during which transmission phases of the Access Code and the Header in the Classic Bluetooth packet are skipped.

The system modifies packet generation characteristics such that the generated packet contains the BLE advertising packet. In addition, the system modifies the modulation characteristics of Classic Bluetooth such that the transmitted packet is the BLE advertising packet. With this system, the problem of a BLE advertising packet cannot be transmitted through Classic Bluetooth is overcome, thereby realizing the Bluetooth beacon function.

DETAILED DESCRIPTION

Figure 1:
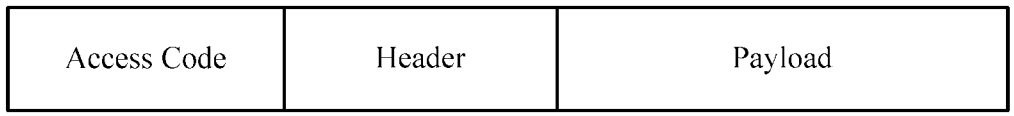
FIG. 1 is a schematic diagram of a data format of a Classic Bluetooth BR packet.

The technical solutions in the embodiments of the present disclosure are clearly and completely described hereinafter in conjunction with the accompanying drawings. It is apparent that the described embodiments are only some embodiments, rather than all embodiments, of the present disclosure. Therefore, the following detailed description of the embodiments of the present disclosure provided in conjunction with the drawings is not intended to limit the scope of the present disclosure, but merely represents selected embodiments of the present disclosure. Any other embodiments obtained by those skilled in the art based on the embodiments of the present disclosure without any creative effort shall fall within the scope of the present disclosure.

The following describes the modulation characteristics of Classic Bluetooth and BLE.

In Classic Bluetooth, there are 79 channels each having a bandwidth of 1 MHz, and adjacent channels have a channel interval of 1 MHz. Transmission or advertising are performed through the 79 channels while performing frequency hopping among the 79 channels in accordance with certain rule. The center frequencies of the channels range from 2402 MHz to 2480 MHz. In Classic Bluetooth, a basic transmission rate of 1 M/bps is achieved when modulation is performed by using Gauss frequency Shift Keying (GFSK), where a positive frequency deviation is represented by 1, and a negative frequency deviation is represented by 0. Bluetooth SIG requires that the minimum frequency deviation in modulation is not less than 115 KHz (i.e., Fmin≥5 KHz).

The center frequency f in Classic Bluetooth is defined as: f=2402+kMHz, where k refers to a BR RF Channel number, and k=0, 1, 2, 3 . . . , 78.

In BLE, there are 40 channels each having a bandwidth of 2 MHz, and adjacent channels have a channel interval 2 MHz. The 40 channels are classified in to two types, including one type for advertising that includes 3 channels, and one type for transmission that includes the other 37 channels. Frequency hopping is performed among only the 3 channels for advertising when advertising is performed, where center frequencies of the 3 channels are 2402 MHz, 2426 MHz and 2480 MHz, respectively. In BLE, at a basic transmission rate of 1 M/bps, modulation performed by using GFSK, where a positive frequency deviation is represented by 1, and a negative frequency deviation is represented by 0. Bluetooth SIG requires that the minimum frequency deviation in modulation at the basic transmission rate is not less than 185 KHz (i.e., Fmin≥185 KHz).

As can be seen from the above, BLE and Classic Bluetooth are similar in terms of following modulation characteristics:

A) the basic transmission rate of 1 M/bps;

B) modulation performed by using GFSK, where the positive frequency deviation is represented by 1, and the negative frequency deviation is represented by 0; and C) frequency points of the BLE advertising channels and frequency points of Classic Bluetooth channels having a correspondence shown in Table 1.

TABLE 1

| BLE channel index | BLE RF channel | RF channel center frequency | Classic Bluetooth Channel Index |
| --- | --- | --- | --- |
| 37 | 0 | 2402 MHz | 0 |
| 38 | 12 | 2426 MHz | 24 |
| 39 | 39 | 2480 MHz | 78 |

BLE differs from Classic Bluetooth in terms of the minimum frequency deviation Fmin. BLE requires the minimum frequency deviation of 185 KHz so as to reduce frequency deviation of the crystal oscillator. Accordingly, the inventor found that, to transmit a BLE advertising packet through Classic Bluetooth, it is required to modify frequency deviation from 115 KHz to 185 KHz, which may be achieved by modifying configuration of a Modem.

Formats of advertising packets of Classic Bluetooth and BLE are described as follows.

Bluetooth protocols define the format of a Classic Bluetooth basic rate packet as shown in FIG. 1. The Classic Bluetooth basic rate packet includes Access Code, Header, and Payload. The Access Code carries an access code of the packet, which is associated with a Classic Bluetooth address and cannot be modified. The HEADER is used for transmission control, including Header Error Check (HEC) and Forward Error Correction (FEC), and is generally generated by a Classic Bluetooth baseband unit and cannot be modified. The Payload carries data to be sent and can be modified.

Figure 2:
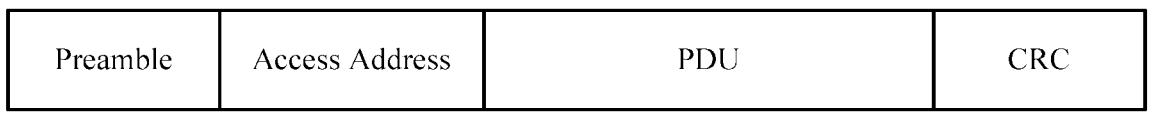
FIG. 2 is a schematic diagram of a data format of a BLE advertising packet.

The format of a BLE basic rate advertising packet, as shown in FIG. 2, includes Preamble, Access Address, Protocol Data Unit (PDU) and Cyclic Redundancy Check (CRC). The Preamble is a preamble frame for configuring automatic gain control according to signal strength. The Access Address carries an advertising access address used when advertising, scanning, and/or initiating a connection. The Preamble and the Access Address are fixed values specified in the Bluetooth core specification. The PDU carries the content to be broadcasted, which can be modified according to actual conditions. The CRC is used for checking the content of the PDU.

As can be seen from the above, the format of the Classic Bluetooth advertising packet of differs from that of BLE. In Classic Bluetooth, only the Payload portion in the packet can be modified. Therefore, the inventor skips the data segments of the Access Code and the Header while generating a packet through Classic Bluetooth, and uses the Payload to carry the BLE data bit stream to be modulated, that is, the Payload portion of the Classic Bluetooth advertising packet carries the entire BLE advertising packet.

The modulation frequency for Classic Bluetooth is modified to adapt to the modulation frequency for BLE, and the Classic Bluetooth packet is modified such that the packet transmitted through Classic Bluetooth contains only the Payload portion, which is configured to carry the data stream having the format of a BLE advertising packet. With the above modifications of the modulation frequency and the packet, the packet transmitted through Classic Bluetooth can be received, demodulated, and recognized by BLE devices, thereby realizing the Bluetooth beacon function.

A first embodiment of the present disclosure is described as follows.

Figure 3:
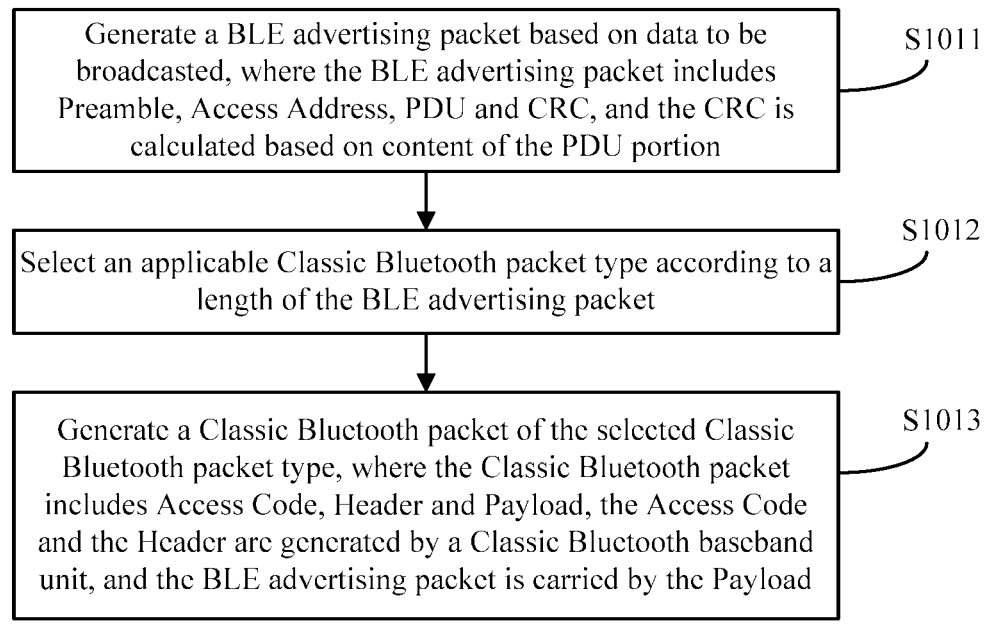
FIG. 3 is a flowchart of a method for generating a BLE advertising packet through Classic Bluetooth according to a first embodiment of the present disclosure.

Based on the above, a method for generating a BLE advertising packet through Classic Bluetooth is provided according to the present disclosure. In the following, a Classic Bluetooth packet is referred to as a BR packet, and an advertising packet based on BLE is referred to as a BLE advertising packet. As illustrated in FIG. 3, the method includes following steps S1011 to S1013.

In step S1011, a BLE advertising packet is generated based on data to be broadcasted.

The BLE advertising packet includes Preamble, Access Address, PDU and CRC, where the CRC is calculated based on the content of the PDU.

In step S1012, an applicable Classic Bluetooth packet type is selected according to the length of the BLE advertising packet.

In step S1013, a BR packet of the selected Classic Bluetooth packet type is generated, the BR packet including Access Code, Header, and Payload. The Access Code and the Header are generated by the Classic Bluetooth baseband unit. The BLE advertising packet is carried by the Payload of the BR packet.

CRC is a hash function for generating a short check code having a fixed number of bits based on certain data such as a network packet or a computer file. The CRC is used for detecting or checking any possible errors due to data transmission or storage. The generated numbers are calculated and appended to the data prior to transmission or storage, and are used by the receiver to perform a check to determine whether the data is changed.

The CRC value is a remainder obtained by dividing a byte stream with another byte stream by using modulo-2 division. In the present disclosure, the divisor for the CRC in step S1011 is a predefined binary number with a length of (n+1), which is expressed by a polynomial. The dividend is a binary representation of the data stream to be checked, that is, a binary representation of the PDU.

As a implementation of the present embodiment, the above n equals 24, that is n=24, and the above polynomial is expressed as $x^{24}+x^{10}+x^9+x^6+x^4+x^3+x+1$.

The PDU, being the content to be broadcasted, is configurable and has a variable length that may be determined according to requirements. In step S1012, a Classic Bluetooth packet with a type and a length that adapt to the length of the BLE advertising packet is selected.

Further, in step S1012, the transmission rate for transmitting the Classic Bluetooth packet is configured to be the basic rate so as to match the characteristics of BLE. Therefore, the Classic Bluetooth packet is transmitted at the basic rate, and is referred to as a basic rate packet.

Figure 4:
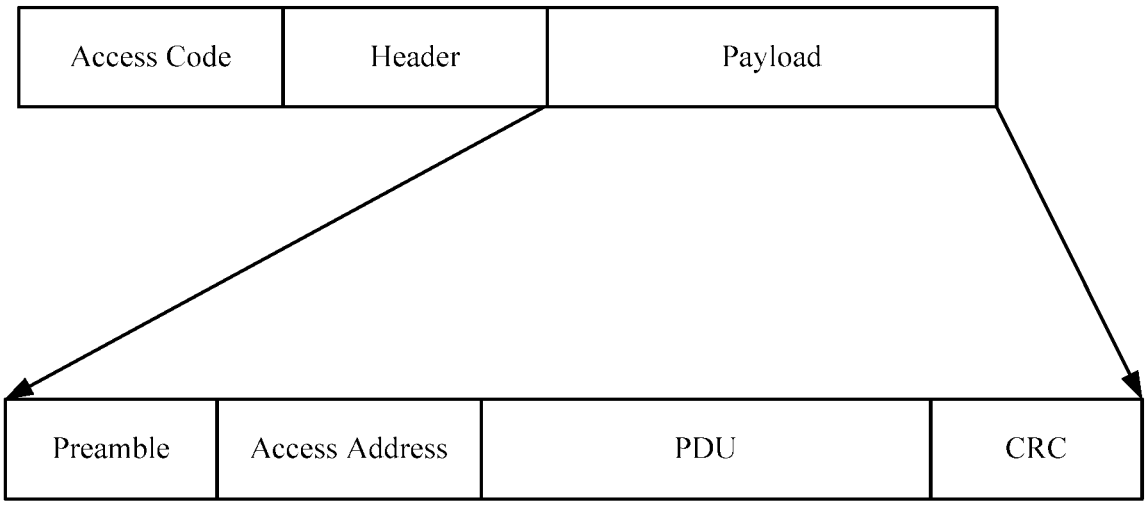
FIG. 4 is a schematic diagram of a data format of a BR packet, where the Payload of the BR packet carries the BLE advertising packet.

Referring to FIG. 2, as described in step S1011, a BLE advertising packet includes four parts: the Preamble for gain control, the Access Address that carries the access address, the PDU that carries the content to be broadcasted, and the CRC for checking the content of the PDU. The Preamble, the Access Address and the CRC occupy 8 bytes in total. In addition, in step S1013, the Payload of the BR packet is configured to carry the BLE advertising packet, as shown in FIG. 4. Therefore, the selected BR packet is required to be capable of containing the entire BLE advertising packet, that is, the length of the Payload in the BR packet is required to be greater than or equal to the length of the BLE advertising packet. The type of the above BR packet may include, but is not limited to, DH1, DH3, DH5 and the like. The maximum lengths of the payload in the DH1, DH3 and DH5 BR packets are 27 bytes, 183 bytes and 339 bytes, respectively.

Figure 5:
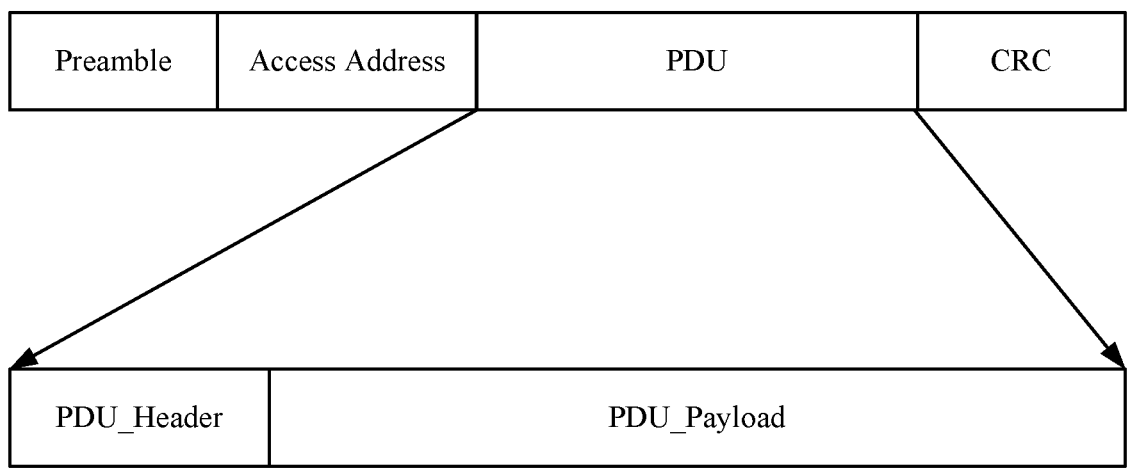
FIG. 5 is a schematic diagram of a data format of a PDU in the BLE advertising packet.

As shown in FIG. 5, the PDU of the BLE advertising packet includes PDU_Header and PDU_Payload, where the PDU_Header is used for representing the content of the PDU, and is generated based on parameters including the type, the length and/or the like of the PDU_Payload. The PDU_Payload is used to carry the content to be broadcasted. The PDU_Header has a fixed length of 2 bytes, while the length of the PDU_Payload is determined based on the content to be broadcasted, that is, the length of the content to be broadcasted equals to the length of the PDU_Payload, that equals to the length of the PDU minus the length of the PDU_Header.

For example, when the length of the content to be broadcasted PDU_Payload in the BLE advertising packet is 4 bytes, the length of the PDU in the BLE advertising packet is the sum of the length of the PDU_Header and the length of the PDU_Payload, which is 2 byte+4 byte=6 byte. The length of the entire BLE advertising packet is the sum of the lengths of the Preamble, the Access Address, the PDU and the CRC, which is 8 byte+6 byte=14 byte. Since 14 bytes is less than the maximum length of the Payload in any one of DH1, DH3, and DH5 BR packets, which are 27 bytes, 183 bytes, and 339 bytes, respectively, the type of the BR packet may be determined to be any one of DH1, DH3 and DH5 among which the DH1 is preferable.

For example, when the length of the content to be broadcasted PDU_Payload in the BLE advertising packet is 37 bytes, the length of the PDU in the BLE advertising packet is the sum of the lengths of the PDU_Header and the PDU_Payload, which is 2 byte+37 byte=39 byte. The length of the entire BLE advertising packet is the sum of the lengths of the Preamble, the Access Address, the PDU and the CRC, which is 8 byte+3 byte=47 byte, exceeding the maximum length of the Payload in the DH1 BR packet of 27 bytes, but being less than the maximum length of the payload in any one of DH3 and DH5 BR packets, which are 183 bytes and 339 bytes, respectively. Therefore, the DH1 BR packet is not applicable, and the type of the BR packet may be determined as any one of DH3 and DH5, among which the DH3 is preferable. The maximum length of the PDU of a general BLE advertising packet is 37 bytes, and the DH3 packet is sufficient.

Based on the above description, the following Table 2 is provided to illustrate, for the DH1, DH3 and DH5 BR packets, the maximum lengths of the Payload in respective BR packets, the maximum allowable lengths for the PDU in the BLE advertising packet and the maximum allowable length for PDU_Payload in the PDU in the BLE advertising packet.

TABLE 2

| Types of BR packet | Maximum length of Payload | Maximum allowable length for BLE PDU | Maximum allowable length for PDU_Payload |
|---|---|---|---|
| DH1 | 27 bytes | 19 bytes | 17 bytes |
| DH3 | 183 bytes | 175 bytes | 173 bytes |
| DH5 | 339 bytes | 331 bytes | 329 bytes |

Further, a packet of the Classic Bluetooth packet type selected in step S1012 has no FEC. The FEC is used for transmitting redundant information that allows the receiver to reconstruct the transmitted data when errors occur during transmission. However, a packet including the FEC may carry additional redundant error correction information generated by the baseband logic for the content of the Payload, which disrupts the data bit stream of the BLE advertising packet. Therefore, a packet of the Classic Bluetooth packet type selected in step S1012 is required to be a packet without FEC.

Further, Classic Bluetooth and BLE, when performing transmission, are incompatible with each other with regard to the whitening processing of a data bit stream. In the above step S1011, when the PDU and the CRC in the BLE advertising packet are generated, BLE whitening processing is performed on the CRC and the BLE according to the advertising channel, such that the data bit stream matches to the BLE whitening requirements from the core specification. Further, while transmitting the BLE advertising packet, the Classic Bluetooth whitening function is disabled so as to avoid performing Classic Bluetooth whitening processing on the data bit stream.

A second embodiment of the present disclosure is described as follows.

Figure 6:
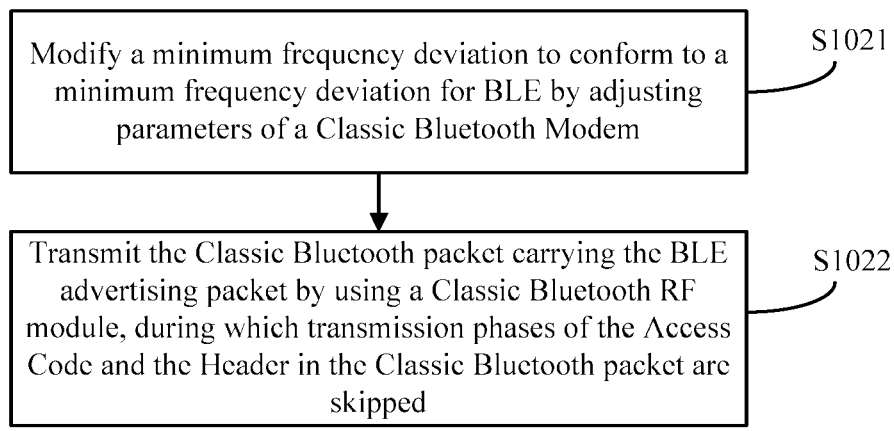
FIG. 6 is a flowchart of a method for transmitting a BLE advertising packet through Classic Bluetooth according to a second embodiment of the present disclosure.

Based on the first embodiment, a method for transmitting the BLE advertising packet generated according to the first embodiment through Classic Bluetooth is provided. Referring to FIG. 6, the method includes following steps S1021 to S1022.

In step S1021, a minimum frequency deviation is modified to conform to the minimum frequency deviation for BLE by adjusting parameters of the Modem.

In step S1022, the Classic Bluetooth packet carrying the BLE advertising packet is transmitted through a Classic Bluetooth RF module while skipping transmission phases of the Access Code and the Header in the Classic Bluetooth packet.

As known from above described modulation characteristics of Classic Bluetooth and BLE, the minimum frequency deviations of Classic Bluetooth and BLE are 115 KHz and 185 KHz, respectively. In step S1021, configuration of the Classic Bluetooth Modem may be modified by modifying a GFSK modulation index. For example, the modulation index of 0.28-0.35 for Classic Bluetooth may be modified to 0.45-0.55 for BLE, such that the Modem determines the modulation symbol based on the content of the Payload.

In the above step S1022, when transmitting the BLE advertising packet, the transmission phases of the Access Code and the Header included in the BR packet as described in step S1011 in the first embodiment may be skipped. In Classic Bluetooth, portions of a Classic Bluetooth packet are sequentially transmitted, that is, the Access Code is first transmitted, then the Header, and finally the Payload. However, a receiver configured for the BLE advertising packet cannot identify the Access Code and the Header. Therefore, the two portions are useless and may even cause failure of parsing the entire BLE advertising packet. Therefore, the Access Code and the Header are skipped when transmitting the BR packet, by, in this embodiment, controlling an on period of a Classic Bluetooth RF module, which includes: delaying the power-on timing of the RF module when the Access Code and the Header are to be transmitted, and powering on the RF module when the Payload is to be transmitted, such that the Payload data is transmitted and broadcasted, and transmission of the Access Code and the Header previous to the Playload are skipped, without affecting normal operation of other devices.

Figure 7A:
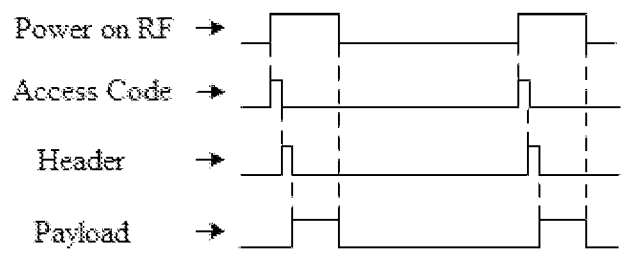
FIG. 7A is schematic diagram of a normal on period of a Classic Bluetooth RF module in transmission phases.
Figure 7B:
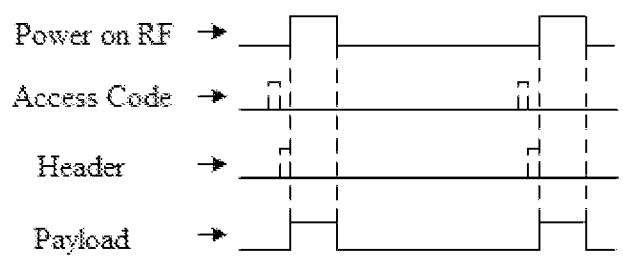
FIG. 7B is schematic diagram of an on period of a Classic Bluetooth RF module in which transmission phases of Access Code and Header are skipped.

Reference is made to FIGS. 7A and 7B. FIG. 7A illustrates a normal transmission procedure of a Classic Bluetooth RF module, where the on period of the RF module covers the transmission phases of the Access Code, the Header and the Payload. FIG. 7B illustrates a transmission procedure of the Classic Bluetooth RF module in which the transmission of Access Code and Header skipped, where powering on of RF module is delayed relative to the transmission phases of the Access Code and the Header; and the on period of the RF module covers the transmission phase of only the Payload.

Further, since Classic Bluetooth and BLE adopt different standards, the whitening processing of Classic Bluetooth is incompatible with that of BLE. The data bit streams of the PDU and the CRC are whitened when generating the BLE advertising packet in the first embodiment. Therefore, the Classic Bluetooth whitening function is required to be disabled while transmitting the BR packet in step S1022, by modifying baseband configuration.

In addition, when transmitting the BLE advertising packet through the Classic Bluetooth RF module in step S1022, the BLE advertising packet is transmitted in specific channels of Classic Bluetooth so as to conform to the characteristics of the BLE advertising packet. The specific channels includes channel 0, channel 24, and channel 78 of Classic Bluetooth, which respective correspond to, channel 37, channel 38, and channel 39 among BLE advertising channels that have center frequencies of 2402 MHz, 2426 MHz, and 2480 MHz, as can be seen from Table 1.

A third embodiment of the present disclosure is described as follows.

Based on the above, a system to which the first and second embodiments are applied is further provided according to the third embodiment of the present disclosure. The system includes a Classic Bluetooth transmitter. The Classic Bluetooth transmitter is configured to transmit the BLE advertising packet by modifying the modulation characteristics and advertising packet generation characteristics of Classic Bluetooth.

In the system, modifying the advertising packet generation characteristics includes modifying a manner in which a Classic Bluetooth advertising packet is generated by using the method according to the first embodiment.

In the system, modifying the modulation characteristics includes modifying a modulation frequency for Classic Bluetooth by using the method according to the second embodiment.

It should be noted that the above descriptions are only preferred embodiments of the present disclosure and are not intended to limit the present disclosure. For those skilled in the art, various alternations and changes can be made to the present disclosure. Any modification, equivalent substitution, improvement and/or the like made within the spirit and principle of the present disclosure shall be contained in the protection scope of the present disclosure.

The invention claimed is:

1. A method for generating and transmitting a Bluetooth Low Energy (BLE) advertising packet through Classic Bluetooth, comprising steps of: step S1011, generating a BLE advertising packet based on data to be broadcasted, wherein the BLE advertising packet comprises Preamble, Access Address, PDU and CRC, and the CRC is calculated based on content of the PDU; step S1012, selecting, according to a length of the BLE advertising packet, an applicable Classic Bluetooth packet type; and step S1013, generating a Classic Bluetooth packet of the selected Classic Bluetooth packet type, wherein the Classic Bluetooth packet comprises Access Code, Header and Payload, the Access Code and the Header are generated by a Classic Bluetooth baseband unit, and the BLE advertising packet is carried by the Payload.

2. The method according to claim 1, wherein the BLE advertising packet is content to be broadcasted by using Classic Bluetooth.

3. The method according to claim 1, wherein step S1011 further comprises performing BLE whitening processing on the PDU and the CRC according to BLE advertising channels.

4. The method according to claim 3, wherein the BLE advertising channels are channel 37, channel 38, and channel 39 defined in Bluetooth core specifications.

5. The method according to claim 1, wherein the Classic Bluetooth packet is a basic rate (BR) packet.

6. The method according to claim 1, wherein the Classic Bluetooth packet of the selected Classic Bluetooth packet type has no forward error correction (FEC).

7. The method according to claim 1, wherein a length of the Payload of the Classic Bluetooth packet is greater than or equal to the length of the BLE advertising packet.

8. The method according to claim 1, further comprising: step S1021, modifying a minimum frequency deviation to conform to a minimum frequency deviation for BLE by adjusting parameters of a Classic Bluetooth Modem; and step S1022, transmitting the Classic Bluetooth packet carrying the BLE advertising packet by using a Classic Bluetooth radio frequency (RF) module, during which transmission phases of the Access Code and the Header in the Classic Bluetooth packet are skipped.

9. The method according to claim 8, further comprising: disabling a Classic Bluetooth whitening function when transmitting the Classic Bluetooth packet carrying the BLE advertising packet by using the Classic Bluetooth RF module.

10. The method according to claim 8, wherein step S1022 of transmitting the Classic Bluetooth packet carrying the BLE advertising packet by using the Classic Bluetooth RF module comprises:
  transmitting the BLE advertising packet through specific Classic Bluetooth channels.

11. The method according to claim 8, wherein in step S1022, the transmission phases of the Access Code and the Header are skipped by controlling an on period of the Classic Bluetooth RF module.

12. A system comprising a Classic Bluetooth transmitter, wherein the Classic Bluetooth transmitter is configured to
  generate a BLE advertising packet based on data to be broadcasted, wherein the BLE advertising packet comprises Preamble, Access Address, PDU and CRC, and the CRC is calculated based on content of the PDU;
  select, according to a length of the BLE advertising packet, an applicable Classic Bluetooth packet type; and
  generate a Classic Bluetooth packet of the selected Classic Bluetooth packet type, wherein the Classic Bluetooth packet comprises Access Code, Header and Payload, the Access Code and the Header are generated by a Classic Bluetooth baseband unit, and the BLE advertising packet is carried by the Payload.

13. The system according to claim 12, wherein the Classic Bluetooth transmitter is further configured to
  modify a minimum frequency deviation to conform to a minimum frequency deviation for BLE by adjusting parameters of a Classic Bluetooth Modem; and
  transmit the Classic Bluetooth packet carrying the BLE advertising packet by using a Classic Bluetooth radio frequency (RF) module, during which transmission phases of the Access Code and the Header in the Classic Bluetooth packet are skipped.

* * * * *